No. 829,786. PATENTED AUG. 28, 1906.
A. HOEFER.
LOCKING DEVICE FOR POTS, &c.
APPLICATION FILED NOV. 27, 1905.

Attest
Gertrude Roderick.
G. M. Copenhaver.

Inventor
Anna Hoefer
by William F. Hall
Atty.

UNITED STATES PATENT OFFICE.

ANNA HOEFER, OF WAHLERSHAUSEN, GERMANY.

LOCKING DEVICE FOR POTS, &c.

No. 829,786. Specification of Letters Patent. Patented Aug. 28, 1906.

Application filed November 27, 1905. Serial No. 289,313.

*To all whom it may concern:*

Be it known that I, ANNA HOEFER, (née Rieger,) a subject of the Emperor of Germany, residing at Wahlershausen, near Kassel, in the Province of Hesse-Nassau, Kingdom of Prussia, Germany, have invented certain new and useful Improvements in Locking Devices for Pots and the Like, of which the following is a specification, reference being had therein to the accompanying drawings.

My invention relates to a locking device for pots and the like, which device is adapted to press the cover on the rim of the pot and the like and includes a handle for carrying about the vessel.

I will now proceed to describe my invention with reference to the accompanying drawings, in which—

Figure 1:
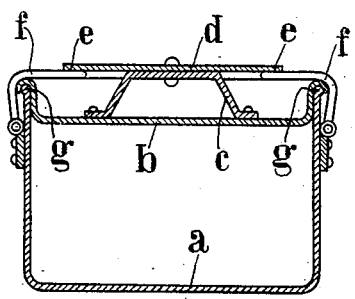
Figure 2:
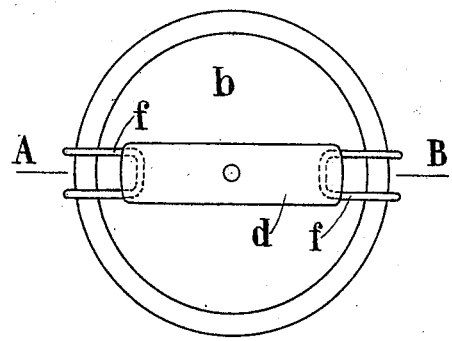
Figure 3:
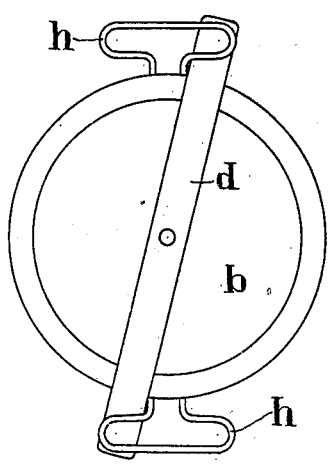

Figure 1 is a vertical section through a pot provided with a locking device on the line A B in Fig. 2. Fig. 2 is a plan of the same. Fig. 3 is a plan of another pot with a modified locking device; and Fig. 4 is a vertical section similar to Fig. 1, the locking device being partly the same as in Figs. 1 and 2 and partly the same as in Fig. 3.

Similar letters of reference refer to similar parts throughout the several views.

In Figs. 1 and 2 a pot $a$ is shown as provided with a rounded-off rim $g$ and two turnable hooks $ff$. The cover $b$ may be made in a shape shown, so as to fit close to the rim $g$, and is provided with a handle $c$. The two hooks $ff$ are arranged for pressing the cover $b$ on the rim $g$ and may in this state be on a level with the top face of the handle $c$, as is shown at Fig. 1. A locking-spring $d$ is mounted to turn on the handle $c$ in the horizontal plane around a pin. This spring $d$ is arranged to bear on the free ends of the two hooks $ff$, and thus to close the pot $a$. To prevent it from shifting inadvertently, its two longitudinal edges are preferably bent a little downward, so as to inclose the free ends of the two hooks $ff$. It will be seen that the pot $a$ is thus tightly closed. If so preferred, a packing-ring (not shown) of any suitable and known material may be fastened on the inside of the annular recess of the cover $b$, in which the rim $g$ engages for hermetically closing the pot. By means of the handle $c$ the pot can be carried about. When it is desired to open the pot $a$, all that is required is to turn the spring $d$ off the ends of the two hooks $ff$ and to turn aside the latter, after which the cover $b$ can be taken off. It is immaterial in which known manner the two hooks $ff$ are pivotally connected with the pot $a$. The pot $a$ may be provided with two stationary hooks or tillers $h\,h$, (see Fig. 3 and the right part of Fig. 4,) and the turnable spring $d$ is in this case so much lengthened as to be able to engage beneath the upper parts of the tillers $h\,h$ from either side. The spring $d$ and the two tillers $h\,h$ should be so arranged as to press the cover $b$ on the rim $g$ of the pot, it being immaterial whether the spring $d$ be made straight, as in Fig. 4 on the right, or bent. The part of the spring $d$ within the rim of the cover $b$ may be flat, or it may be made concave on the lower side by bending its two longitudinal edges a little downward. (See Fig. 4.) In this case the cover $b$ is preferably so placed on the pot $a$ that its handle $c$ is in the same longitudinal plane as the spring $d$ after the latter has been turned to engage beneath the two tillers $h\,h$. (See Fig. 3.) Then the spring $d$ will be prevented from shifting inadvertently, since its downwardly-bent longitudinal edges elastically bear on the corresponding edges of the handle $c$. The manner of operating this locking device is evident after the above explanations.

Figure 4:
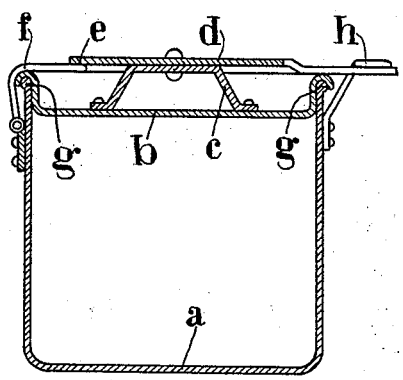

The locking device may be made partly as in Figs. 1 and 2 and partly as in Fig. 3 in the manner shown at Fig. 4, which requires no further explanation. The pot $a$ may be of any known kind, and also the cover $b$, the essential point being that the cover $b$ can be pressed on the rim $g$ of the pot and the like by means of the locking device. The locking device may be varied without departing from the spirit of my invention.

What I claim as my invention, and desire to secure by Letters Patent, is—

1. The combination with a vessel and the cover therefor designed to seat upon the rim thereof, of a handle for the cover, two clips attached respectively upon opposite sides of the vessel to the exterior of the same a distance below the rim thereof and provided with angular portions disposed in substantially horizontal planes above the top of the rim and a spring member secured to the handle and designed to engage the angular portion of the clips for holding the cover onto the vessel, substantially as described.

2. The combination with a vessel and a cover therefor having its rim engaging the edge of the vessel, of a clip pivoted to the exterior of the vessel below the edge thereof and provided with an angular portion designed to engage the rim of the cover and extend inwardly beyond said rim and a spring-plate secured to the cover designed to bear down upon said inwardly-extending end of the clip for holding the rim of the cover into engagement with the edge of the vessel, substantially as described.

3. The combination with a vessel, of a dished cover having a vertical edge wall terminating in a substantially horizontally-disposed rim designed to embrace the edge of the vessel, a handle secured to the central part of the cover having its top in substantially the plane of said rim, clips secured to the side of the vessel having horizontally-disposed parts and a plate pivoted to the top of the handle designed to engage the horizontally-disposed parts of the clip, substantially as described.

4. The combination with a pot and the like, of a cover adapted to be pressed on the rim of said pot and the like, a handle fastened on said cover, a hook pivotally connected with said pot and the like and adapted to press said cover at the one side on said pot and the like, a second hook fastened on said pot and the like opposite to said hook, and a spring mounted to turn on said handle and adapted to lock the free ends of said hooks and to engage beneath said second hook for pressing said cover at the other side on said pot and the like.

In testimony whereof I have affixed my signature in presence of two witnesses.

ANNA HOEFER, (née RIEGER.)

Witnesses:
PAUL SCHMIDT,
GEORG SEIBOLD.